Dec. 7, 1965     O. C. NUTTER     3,221,381
SYSTEM FOR COOLING FOUNDRY SANDS IN PROCESS
Filed May 4, 1962     3 Sheets-Sheet 1
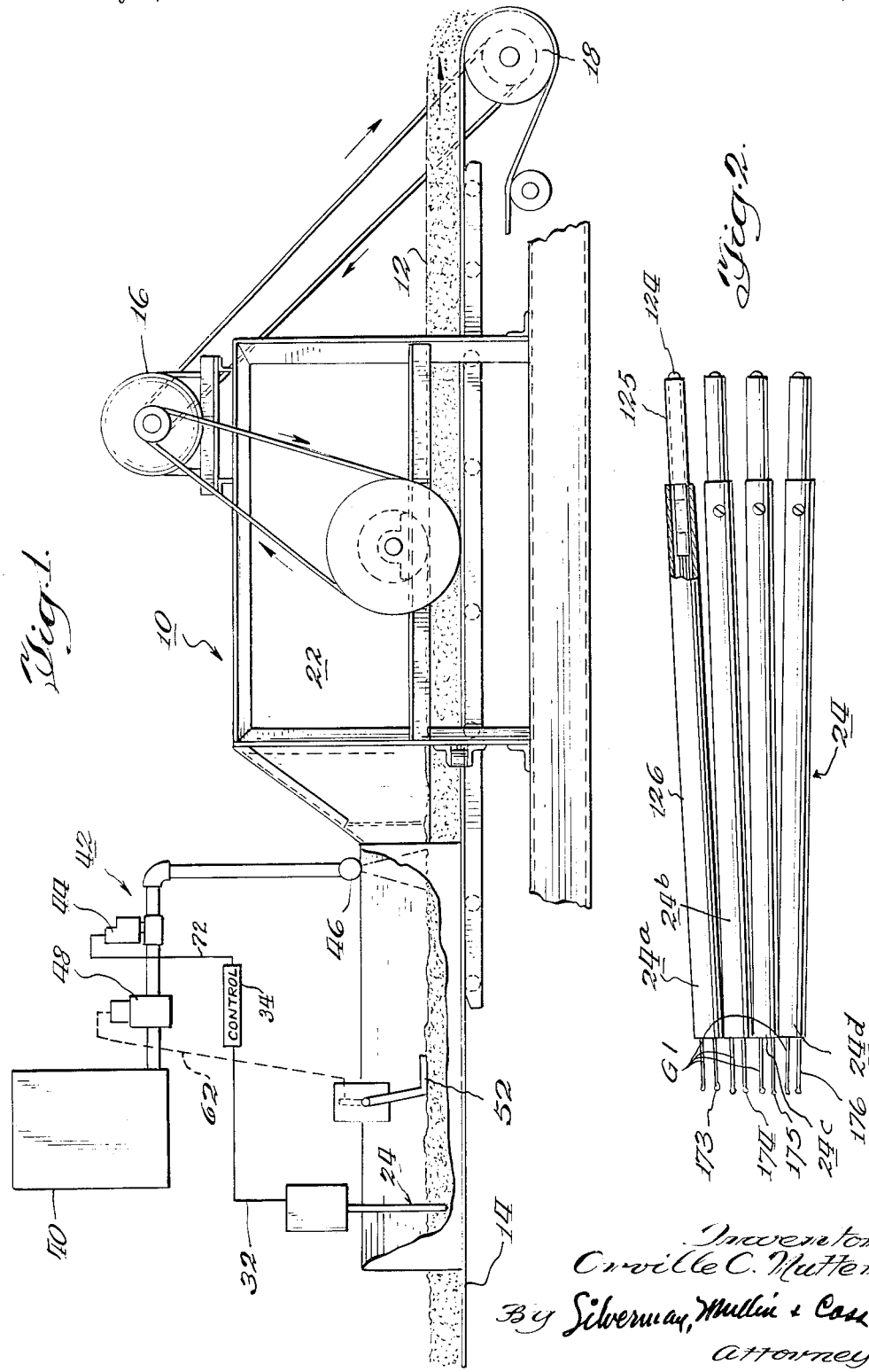

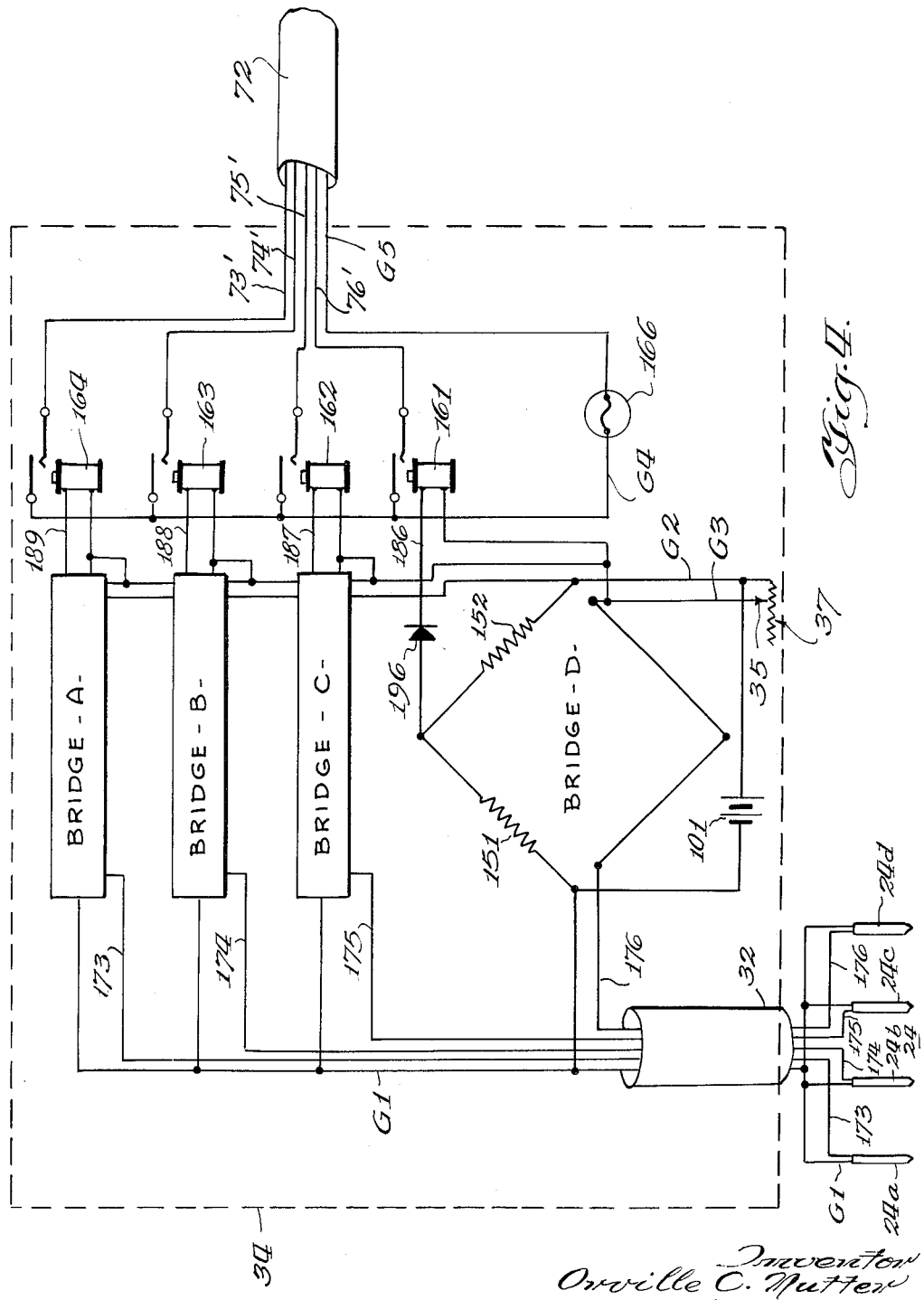

United States Patent Office 3,221,381
Patented Dec. 7, 1965

3,221,381
SYSTEM FOR COOLING FOUNDRY SANDS
IN PROCESS
Orville C. Nutter, West Chicago, Ill., assignor to Pekay
Machine & Engineering Co. Inc., Chicago, Ill., a corporation of Illinois
Filed May 4, 1962, Ser. No. 192,567
6 Claims. (Cl. 22—89)

This invention relates to apparatus for processing granular particles. More particularly, in an important aspect, this invention relates to apparatus for processing sands of the type customarily employed in forming molds for employment with high temperature molten materials, metals and the like.

Sands and the similar granular materials customarily employed in the formation of molds represent a significant portion of the cost of the many molded items in our world of commerce today. The employment of molded metal castings, for example, reduces very substantially the cost of machining highly intricate parts such as automobile engine parts and the like.

To be effective for their purposes, however, such castings necessitate employment of expensive sands and similar granular, pulverulent materials having accurately controlled characteristics. Typically, the moisture content of such granular materials must be carefully regulated and the chemical composition of these materials, too, must be carefully controlled. This is so in order that molds made of such materials may be physically stable under the normally extreme temperature conditions and under the relatively indelicate handling conditions of the molding industry.

Because of these severe demands, only a few materials are suitable for molding purposes. Thus, these materials become expensive. Hence, not only must the composition of such raw material be carefully controlled, but, as well, after each use in molding operations the sand must be reclaimed. That is, the mass of such sand must be rendered uniform throughout, both in particle size and in composition, for further employment.

While, relatively speaking, such sand is expensive, this expense is not comparable to diamonds or to other precious stones. Accordingly, it becomes an economic necessity that mold sand or other similar material be processed rapidly and automatically. Thus, the mold sand may be repeatedly reused, at short intervals, with a minimum of testing and observation by highly paid human beings. Hence these materials must be promptly cooled after high temperature employment to a conven ient manageable level.

At the same time such cooling must not destroy other desirable characteristics of the expensive mass of particles. Illustrating, the moisture content of the mass must not be shifted from an indicated desirable level.

Accordingly it is a principal obpect of the present invention to monitor the temperature of a mass of particles in process.

It is a further object of the present invention to accomplish rapid cooling of a mass of particles.

It is a further object of the present invention to insure a substantially uniform composition of the resulting cooled particle mass.

It is a still further object of the present invention to accomplish the aforementioned objects automatically and rapidly, thus to eliminate the need for costly human process control.

It is a still further object of the present invention to eliminate fragile monitoring elements from apparatus for accomplishing the aforementioned objectives in consistence with the rough handling requirements of the materials handling industry.

These and other objects are accomplished in accordance with the invention in one embodiment by providing a continuously moving, sand transporting, looped belt having upper and lower reaches. This belt is arranged to receive sand to be processed on the upper reach for longitudinal transport and processing.

This so received sand is supplied from a suitable hopper and, often may comprise heterogeneous mixture of cool replenishing sand and heated, recently used mold sand. Evidently, under certain circumstances, this sand may be entirely new, replenishing sand. In other situations this sand may be entirely heated sand, newly extracted from molds heated by molten metal.

Toward reducing the temperature of this sand to a manageable processing level, say from 300° F. to 120° F. in one situation, there are provided in accordance with the invention plural leads to a spray header. Through these leads, coolant water is supplied for application to the longitudinally transported, heated sand.

A transversely disposed army of plural temperature sensitive elements, thermistors, encased in heat conducting copper are positioned proximate the moving belt at a first station, a monitor station, prior to arrival of the sand of the cooling station. The thermistors at this monitor station sense the temperature of the mass of sand as it is transported thereby. The plural themistors of the array at the first, monitor station generate corresponding plural electrical signals, signals in the form of current variations caused by resistance variations of the thermistors in circuit with a battery, as is well known in the art, at various levels in dependence upon the instantaneous temperature of the proximate passing sand particles.

These plural signals are applied, respectively, through associated threshold responsive means for actuating individual ones of an array of plural coolant admitting valves to an open condition. This second array, the array of coolant valves, is disposed for dispensing coolant longitudinally along the path of belt travel at a second station. Thus coolant fluid under pressure, with advantage this coolant fluid is water, is admitted from a reservoir through actuated ones of the valves to a header for cooling the sand. This actuation of the individual valves occurs as the respectively associated threshold responsive devices are triggered by a temperature sensing element signal above a preassigned threshold.

Thus, in this illustrative embodiment of the invention, a first valve is opened in response to a temperature signal indicative of a sand temperature in excess of 120° F., a second valve is opened in response to a temperature in excess of 140° F., and so on.

Still further, in this embodiment of the invention, control means associated with the level of the sand provided on the upper reach of the transporting belt are operative to control the pressure of the coolant liquid applied through the plural valves to the transported sand. Thus, as the level of the transported sand layer increases, level measuring means are provided for operating a well-known pressure regulating valve associated with the coolant supply leads to the individual valves of the aforementioned plurality. Hence, as the sand volume passing the coolant spray station increases, the pressure of liquid passing through valves, opened by the aforementioned threshold responsive devices, similarly increases.

Hence, as the mass of sand particles passes along the upper reach of the belt beyond the coolant applying station, this coolant is evaporated by residual heat in the sand mass and, at the same time, the resulting cooling effect uniformly lowers the temperature of the sand transported. Thus, it is a feature of the invention that plural temperature sensing elements are arrayed at a first station laterally across a longitudinally moving reach of a material transporting conveyer.

It is a further feature of the invention that the temperature sensing elements of the first station array are disposed proximate the particle transporting conveyer reach.

It is a further feature of the invention that plural coolant controlling valves are disposed in an array for supplying coolant to the conveyer transported particle mass at a second station.

It is a further feature of the invention that coolant is supplied under pressure to the valves of the last named array.

It is another feature of the invention that means are provided for deriving signals indicative of the volume of material transported by the conveyer.

It is a still further feature of the invention that means responsive to volume indicating signals are provided for adjusting the pressure of coolant supplied to the applying header in proportional relation to the rate of material transported along the conveyer.

The achievement of these and other objects and still other features and advantages of the invention will be more clear from a consideration of the following brief description of an illustrative embodiment of the invention shown in the drawings and in consideration of the appended claims.

In the drawings:

FIG. 1 is an elevation view of sand processing apparatus in accordance with the invention;

FIG. 2 is a partially sectioned, plan view of an array of temperature sensing elements for employment in the structure of FIG 1;

FIG. 4 is a schematic diagram of control apparatus for employment with the apparatus of FIG. 1 and FIG. 3.

Figure 3:
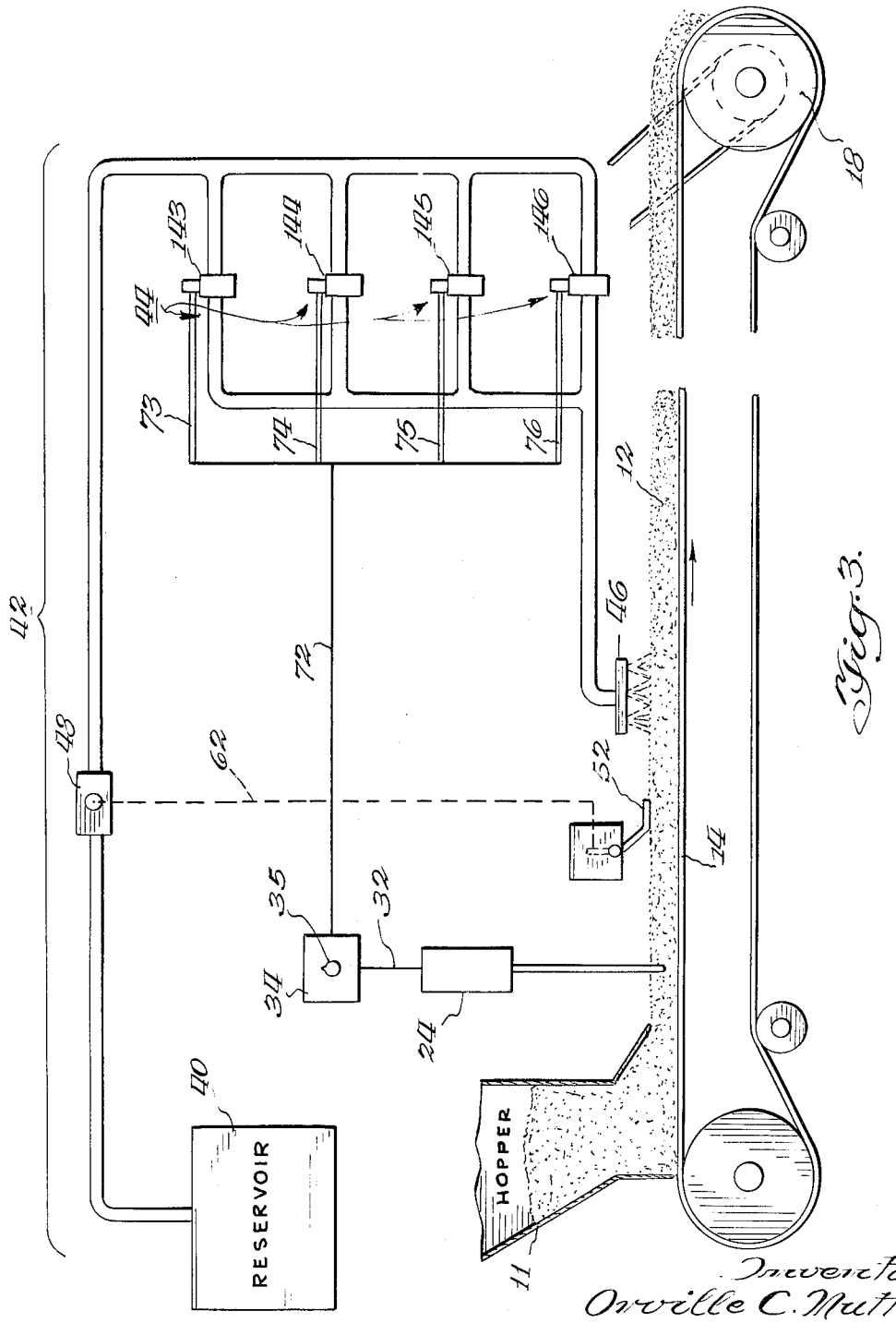
FIG. 3 is a partially schematic, functional diagram of sand processing apparatus in accordance with the invention.

Referring now more particularly to the drawings, in FIG. 1 there is shown apparatus 10 for processing a mass 12 of granular particles such as foundry molding sand. A conveyer belt having an upper reach 14 is arranged for transporting this sand longitudinally from left to right, as shown, under drive of an electric motor 16 operating through pulley driven wheel 18.

With advantage, this processing apparatus 10 includes a mixer-muller apparatus 22 of the type disclosed and claimed in Patent 2,920,361, granted January 12, 1960 to Conrad Michalowski and I. Irving Silverman.

The mass of granular particles typically comprises a heterogeneous mixture of cold, replenishing sand and hot sand, recently used in a mold for a metal foundry process.

Economic operation of such a process requires that the molding sand be promptly reused. Accordingly, as the heterogeneous sand mixture is transported longitudinally for processing toward such reuse as in the mixer-muller apparatus shown, the mass of sand is probed by an array 24 of plural temperature sensing elements disposed transversely across the path of longitudinal transport of the sand. The resistance of these plural elements are temperature responsive. The plural elements are connected through like plural leads in cable 32 to control apparatus 34.

This control apparatus is associated with a reservoir 40 for containing coolant water, under pressure. From the reservoir, this water passes through suitable pipe connecting means 42 to a spray header 46 for passage through plural nozzles to cool the longitudinally transported sand particle mass 12.

The pipe connecting means includes an adjustable pressure regulator 48 for adjusting the pressure applied to the spray nozzle header in accordance with the level of the sand mass to be processed. With advantage this control is accomplished by a simple arm 52 riding on the top surface of the sand mass as shown. Through suitable well known linkages 62 indicated by a dashed line, this arm transmits a rotary mechanical control signal to adjust the pressure level of pressure regulating valve 48.

This valve, conveniently, is of the type known commercially as the Norgren Pressure Regulator and is available from the C. A. Norgren Company of Denver, Colorado. This Norgren valve is provided with a rotatable pressure regulator control such that the convenient and well known linkage 62 operates to control the pressure applied through the connecting means 42 in accordance with movements of the arm 52. Thus, as the sand level increases, the regulator increases the pressure of water supplied to the header 46.

For passage to this header 46, however, the coolant water must pass through a plurality 44 of solenoid valves corresponding in number to the plurality of temperature responsive elements noted heretofore. These plural solenoid valves are, conveniently, of the type known commercially as the Atkomatic valve, available from the Atkomatic Valve Company, Indianapolis, Indiana. Such valves are operable between open and closed conditions in response to an electric signal applied thereto.

In accordance with this embodiment of the invention, operating voltages are respectively applied to each solenoid valve of the above noted plurality by way of lead cable 72 through control circuit 34. These operating voltages are applied to the individual valves under the influence of a respectively associated one of the temperature sensing elements in the array 24.

Thus, as the individual temperature sensing elements of the array sense a temperature in the sand mass above a pre-assigned threshold, control signals are passed from the control apparatus 34 to open an associated one of the valves of the plurality 44. Noting that the sand level measuring arm 52 has controlled the pressure of coolant applied to each of these plural valves, operation of this illustrative apparatus in accordance with the invention now becomes clear. As the level of the sand, and hence the volume of the sand, transported by the belt reach 14 increases, so the pressure of the coolant applied to this mass of particles increases.

Similarly, as individual ones of the temperature sensing element array are stimulated above a preassigned threshold, so the number of coolant admitting passages are increased. Thus, the amount of coolant fluid applied to the heterogeneous mass of sand particles is automatically regulated in accordance with the temperature of the sand and the amount of said to be cooled.

Turning next to FIG. 2, here the temperature sensing element array 24 is seen in plan view. As shown, this array comprises four elements 24a, 24b, 24c, and 24d. These sensing elements are arrayed transversely across the path of motion of the sand transporting conveyer 12 shown in FIGS. 1 heretofore and FIG. 3 hereafter. Each of the plural elements is substantially identical and will be considered in detail only with reference to the representative one element 24a which is shown in partial section.

This representative sensing element 24a comprises, first, a thermistor 124. This thermistor advantageously is one of the well known type available commercially, for example, from the Fenwal Corporation of Framingham, Massachusetts. The particular thermistor employed in this embodiment of the invention varies in resistance from 20,000 ohms to 500 ohms as it is subjected to temperatures ranging from 400° to 100° F. The thermistor proper is encased in a sheath of metal 125, here copper, having high thermal conductivity.

This sheath serves to protect the thermistor from the abrading effects of the particle mass in which it is normally immersed. At the same time, this sheath allows the thermistor to be readily responsive to temperature changes in the surrounding sand.

The protective sheath and the thermistor proper are mounted in a tubular holder 126 of substantial physical strength. In this embodiment of the invention, this holder is advantageously constructed of steel.

Through the tubular holder electrical leads G–1 and 173 are passed from the thermistor. Similar numerical designators are applied to similar leads in the other thermistors of the array shown.

Turning next to FIG. 3, the apparatus in accordance with this embodiment of the invention is seen in a partially schematic, functional, elevation diagram. In this FIG. 3 geometric relations of the actual structure are disregarded where indicated to serve the purpose of functional clarity. Structural elements shown in other figures are given corresponding designating numerals and may be seen in more detail by reference to these other figures.

In this FIG. 3, the conveyer upper reach 14 is shown mounted for longitudinally transporting a particle mass 12, sand, from left to right under the influence of drive roller 18, rotating as indicated. The sand is supplied to the conveyer from a hopper 11. Coolant water under pressure is supplied from the reservoir 40 to pipe connecting means 42 through the controlled pressure regulating valve 44.

The pressure of the coolant passing this valve is regulated by a mechanical linkage 62, indicated by dashed lines but not shown in detail, under the influence of rotatable arm 52 resting on the surface of the transported sand 12.

The sensing element array 24 is shown having the component sensitive probes immersed in contact with the transported sand particle mass 12. Signals from the several probes are taken by way of cable 32 to the control apparatus 34. As shown, this apparatus is equipped with a control knob 35 by which adjustment is made for the desired temperature at which the particle mass is sought to be controlled.

From the control apparatus signals are conducted by way of cable 72 for controlling the individual valves of the plurality 44 between open and closed conditions. Contained within the cable 72 are lead pairs 73, 74, 75 and 76 respectively associated with the individual valves 143, 144, 145 and 146 and with the sensing elements 24a, 24b, 24c and 24d. In detail, each lead pair includes a common lead G–5.

Turning next to FIG. 4, the schematic circuit arrangements for accomplishing the functions of this embodiment of the invention are shown. In this figure are shown the four temperature sensing elements of the array 24. One lead from each of these thermistors 24a, b, c and d, is a common lead G–1. Respectively associated with each of these thermistors is a second lead 173, 174, 175 and 176. These five leads are cabled in common to make up cable 32 for interconnecting the temperature sensing element array 24 with the control apparatus 34, indicated by dashed lines.

Within the control apparatus 34 are four threshold responsive devices, bridges, A, B, C and D, respectively associated with the individual thermistors of the array 24. These bridges are substantially identical. They differ only in the values of a pair of fixed resistors in adjacent bridge arms. The four bridges are energized by a common potential source, battery 101, connected across the aforementioned pairs of serially connected fixed resistors by way of common leads G1 and G2.

The bridge arms opposite the resistor pairs are made up of a serially connected arrangement of a potentiometer 37, which is adjustable by the control knob 35 noted heretofore in connection with FIG. 3 but here shown schematically, and that individual one of the thermistors of the array 24 with which the bridge is associated.

For definiteness, attention is directed to an illustrative one of the four bridges, bridge D, shown in schematic detail in FIG. 4. From the above remarks it will be clear to those skilled in the art how other ones of the four bridges function from consideration only of this bridge D in detail.

The bridge D is associated individually with thermistor 24d. This thermistor serves the purpose of giving an operating signal to one of the previously noted solenoid valves upon sensing a temperature above a preassigned threshold, say 120° F. Illustratively, others of the thermistors serve the same purpose at thresholds of 140° F., etc.

The serially connected resistors 151 and 152 comprising one branch of bridge D are chosen in accordance with the well known bridge circuit art such that, with a given setting of the potentiometer 37, the raising of the temperature of the thermistor 24d to a preassigned threshold, causes a current to flow outwardly from the bridge by way of diode 196 and lead 186.

Thus, relay 161 is energized by current which flows from the battery 101 through the bridge by way of diode 196 to lead 186 and returning to battery by way of common lead G3. This energization of relay 161 causes the relay armature to switch from the neutral position shown to supply potential to lead 76′ by way of common leads G4 and G5 from an electric power source 166. This source is any convenient source of power, say an electric wall plug.

Similar relays 162, 163 and 164 operate in similar fashion to supply potential from the source 166 to the leads 73′, 74′ and 75′ and to cable 72 as the respectively associated thermistor is raised in temperature above a preassigned threshold.

Recalling that the leads 73′, 74′, 75′ and 76′, together with a common ground lead G5, make up the corresponding lead pairs 73, 74, 75 and 76 of FIG. 3, it now appears that solenoid operated valves 143, 144, 145 and 146 are controlled to open conditions respectively by raising of the temperature of the associated sensing elements 24a, b, c and d above preassigned thresholds.

It will be recalled that potentiometer 37 is a common arm of the four bridges A, B, C and D. The four thermistors 24a, b, c and d, respectively, make up an associated, serially connected arm in these same four bridges. Accordingly, as the resistance values of the fixed bridge arm resistors, e.g., resistors 151 and 152, establish relative temperature threshold values for operation of the four solenoid valves, so the level of all these threshold values may be simply adjusted in accordance with the invention by adjustment of the potentiometer 37 through operation of control knob 35, seen best in FIG. 3.

Thus, in accordance with this illustrative embodiment of the invention, it is seen that facilities are provided for accurately, automatically, and simply controlling both temperature and moisture content of a transported agglomerate mass of particles. Other and varied embodiments of the invention will readily occur to those skilled in the art.

What I claim is:

1. Apparatus for processing massed granular particles transported on a reach of a conveyor having two stations spaced apart along the path of transport which comprises: means for supplying a mass of the particles to the conveyor reach; a group of individually responsive thermistor-type temperature sensing elements, disposed near the conveyor in temperature sensing relation with the particles in transit on the reach at the first station; a coolant reservoir; coolant applying header means for applying coolant to the particle mass in the course of transport at the second station; means for passing coolant from the reservoir to the header; a group of individually responsive coolant admitting valves, each valve having only a completely open state and a completely closed state, disposed intermediate the reservoir and the header in the coolant passing means; variable pressure regulating means interposed in the coolant passing means between the reservoir and the group of valves for adjusting the pressure of coolant passed from the reservoir to the header; level measuring means for deriving a level control signal proportional to the level of the particle mass in passage from station to station; linkage means for adjusting the variable regulating means in response to the control signal; and a plurality of individually responsive control circuits, each being connected between one of the sensing elements and one of the admitting valves for selectively causing the operations of the admitting valves from one state to the other in response to signals from the sensing elements, each admitting valve being operated in response to a signal caused by a temperature sensed by its associated element, said temperature associated with at least one admitting valve being different from the temperature associated with any other admitting valve.

2. Apparatus for processing massed granular particles transported on a reach of a conveyor having two stations spaced apart along the path of transport which comprises: means for supplying a mass of the particles to the conveyor reach; a group of individually responsive thermistor-type temperature sensing elements disposed near the conveyor in temperature sensing relation with the particles in transit on the reach at the first station; means for applying coolant to the particles on the reach at the second station; a group of individually responsive coolant admitting valves, each valve having only a completely open state and a completely closed state, each of the valves in fluid connection with the coolant applying means for controlling the amount of coolant to the particles; and a plurality of individually responsive control circuits, each being connected between one of the sensing elements and one of the admitting valves for selectively causing the operation of the admitting valves from one state to the other in response to signals from the sensing elements, each admitting valve being operated in response to a signal caused by a temperature sensed by its associated element, said temperature associated with at least one admitting valve being different from the temperature associated with any other admitting valve.

3. Apparatus as set forth in claim 2 wherein each control circuit comprises an individually responsive threshold detecting means responsive to temperature sensing signals at a preassigned amplitude threshold for causing operation of its associated valve from one state to the other.

4. Apparatus as set forth in claim 3 and in combination therewith means for simultaneously adjusting the threshold response levels.

5. Apparatus as set forth in claim 2 comprising an addition mounting means for said thermistors comprising sheaths constructed of high thermal conductivity material whereby the thermistors of said first array are protected from abrading influences of materials transported therepast.

6. Apparatus for processing massed granular particles as set forth in claim 3 wherein such threshold detecting means comprises a variable resistor, a pair of fixed resistors; the sensing element and the resistor pair being series connected, and the variable resistor being connected in common between the sensing element and the resistor pair to form a closed bridge circuit having a first and a second pair of diagonally opposite terminals, the resistance values of the resistors of the bridge circuit being selected for balance under an ambient temperature condition which is different for at least one bridge from that associated with any other bridge; a potential source connected across the first pair of terminals, whereby a potential is generated across the second pair of terminals in response to variations in temperature of the sensing element; a rectifying diode connected to one terminal of the second pair of diagonally opposite terminals, and operating means connected in circuit between the rectifying diode and the other terminal of the second pair of diagonally opposite terminals for operating the corresponding admitting valve selectively in response to variations in resistance of the corresponding sensing element.

References Cited by the Examiner
UNITED STATES PATENTS

| | | | |
|---|---|---|---|
| 2,273,126 | 2/1942 | McGillin | 22—89 |
| 2,848,008 | 8/1958 | Dietert et al. | 22—89 |
| 3,082,497 | 3/1963 | Michalowski | 22—89 |

WILLIAM J. STEPHENSON, *Primary Examiner.*

MICHAEL V. BRINDISI, *Examiner.*

UNITED STATES PATENT OFFICE
CERTIFICATE OF CORRECTION

Patent No. 3,221,381 December 7, 1965

Orville C. Nutter

It is hereby certified that error appears in the above numbered patent requiring correction and that the said Letters Patent should read as corrected below.

Column 8, line 4, for "an" read -- in --; column 8, line 7, for "first array" read -- group --.

Signed and sealed this 11th day of October 1966.

(SEAL)
Attest:

ERNEST W. SWIDER
Attesting Officer

EDWARD J. BRENNER
Commissioner of Patents